United States Patent
Ong et al.

(10) Patent No.: US 10,412,004 B2
(45) Date of Patent: Sep. 10, 2019

(54) GIGABIT ROUTER

(71) Applicant: Google LLC, Mountain View, CA (US)

(72) Inventors: Tony Ong, San Jose, CA (US); Avery Pennarun, New York, NY (US)

(73) Assignee: Google LLC, Mountain View, CA (US)

( * ) Notice: Subject to any disclaimer, the term of this patent is extended or adjusted under 35 U.S.C. 154(b) by 142 days.

(21) Appl. No.: 15/786,782

(22) Filed: Oct. 18, 2017

(65) Prior Publication Data
US 2018/0278523 A1 Sep. 27, 2018

Related U.S. Application Data

(60) Provisional application No. 62/475,271, filed on Mar. 23, 2017.

(51) Int. Cl.
| | |
|---|---|
| H04L 12/741 | (2013.01) |
| H04L 29/12 | (2006.01) |
| H04W 88/10 | (2009.01) |
| H04L 12/773 | (2013.01) |
| H04L 29/06 | (2006.01) |

(52) U.S. Cl.
CPC .............. *H04L 45/74* (2013.01); *H04L 45/60* (2013.01); *H04L 61/2514* (2013.01); *H04L 61/2517* (2013.01); *H04L 69/22* (2013.01); *H04W 88/10* (2013.01); *H04L 45/54* (2013.01); *H04L 63/0227* (2013.01)

(58) Field of Classification Search
CPC ..... H04L 69/22; H04L 61/25; H04L 61/2503; H04L 61/2514; H04L 45/74; H04L 61/2517
See application file for complete search history.

(56) References Cited

U.S. PATENT DOCUMENTS

| | | | |
|---|---|---|---|
| 7,884,572 B2 | 2/2011 | Zhao | |
| 8,391,211 B2 | 3/2013 | Huang et al. | |
| 2010/0124191 A1* | 5/2010 | Vos | H04L 29/12367 370/328 |
| 2012/0300678 A1* | 11/2012 | Kezys | H04L 12/6418 370/261 |
| 2013/0287006 A1* | 10/2013 | Nix | H04L 29/125 370/331 |
| 2014/0006593 A1* | 1/2014 | Sarawat | H04M 15/58 709/224 |
| 2018/0132159 A1* | 5/2018 | Strong | H04L 45/00 |

* cited by examiner

*Primary Examiner* — Omer S Mian
(74) *Attorney, Agent, or Firm* — Honigman LLP

(57) ABSTRACT

A method includes receiving a data packet over one of a wireless communication link or a wired communication link from a user device in the local network. The data packet includes internet protocol (IP) address information. The method also includes determining whether the IP address information includes corresponding packet forwarding rules. When the IP address information includes corresponding packet forwarding rules, the method includes performing network address translation on the IP address information by mapping a source IP address from a private source IP address subnet to a public source IP address subnet, attaching the public source IP address subnet to the header of the data packet, and forwarding the data packet from the Ethernet switch to an external network port. The external network port is configured to connect the network routing device to the external network.

25 Claims, 10 Drawing Sheets

GIGABIT ROUTER

CROSS REFERENCE TO RELATED APPLICATIONS

This U.S. patent application claims priority under 35 U.S.C. § 119(e) to U.S. Provisional Application 62/475,271, filed on Mar. 23, 2017, which is hereby incorporated by reference in its entirety.

TECHNICAL FIELD

This disclosure relates to a gigabit router for routing data within a local network and/or between the local network and an external network.

BACKGROUND

An access point generally allows multiple user devices to communicate with one another to form a local network, as well as communicate with an external public network, i.e., the Internet. The access point and the user devices may communicate via wired connections and/or wireless connections that free individuals from the restrictions of cables and wires associated with wired connections. The access point typically connects to the external network, i.e., the Internet, and routes data between the Internet and the user devices of the local network. Access points may be configured to route data packets between the Internet and the local network at a rate of a gigabit per second.

Access points, e.g., routers, providing gigabit data transfer rates currently utilize a system-on-chip (SoC) multi-core processor to configure, setup, and manage all routing functionalities, such as, without limitation, gigabit WiFi, gigabit Ethernet, network address translation (NAT), virtual Local Area Network (VLAN) segregation, traffic management, packet processing forwarding, and/or encryption. Accordingly, the SoC multi-core processors require a large amount of processing power in order to handle high bitrates (e.g., gigabit per second per port) and a large amount of pins to connect to each module of the router architecture.

SUMMARY

The use of a system-on-chip (SoC) multi-core processor and associated flash memory and/or Dynamic Random-Access Memory (DRAM) drastically increases the cost to manufacture gigabit routers. Additionally, requiring each packet of data in transient to flow through the SoC multi-core processor reduces latency and performance of the gigabit router. The present disclosure describes systems and methods for routing data within a local network and/or between the local network and an external network without the use of a SoC, inter alia.

One aspect of the disclosure provides a method for routing data between an external network and a local network. The method includes receiving, at a network routing device of the local network, a data packet over one of a wireless communication link or a wired communication link from a user device in the local network. The data packet includes internet protocol (IP) address information. The IP address information includes a source IP address associated with the user device and a destination IP address associated with an external network. The method also includes determining, by an Ethernet switch of the network routing device, whether the IP address information includes corresponding packet forwarding rules. When the IP address information includes corresponding packet forwarding rules, the method includes: performing, by the Ethernet switch, network address translation on the IP address information by mapping the source IP address from a private source IP address subnet to a public source IP address subnet; attaching, by the Ethernet switch, the public source IP address subnet to the header of the data packet; and forwarding the data packet from the Ethernet switch to an external network port. The external network port is configured to connect the network routing device to the external network.

Implementations of the disclosure may include one or more of the following optional features. In some implementations, receiving the data packet includes receiving the data packet over the wireless communication link at radio circuitry coupled to a primary antenna array configured to transmit and receive radio frequency signals over a 5 Gigahertz frequency band. The radio circuitry may be located at a primary Wireless Fidelity (Wi-Fi) module connected to the Ethernet switch. Receiving the data packet may also include receiving the data packet over the wireless communication link at radio circuitry coupled to a secondary antenna array configured to transmit and receive radio frequency signals over a 2.4 Gigahertz frequency band. The radio circuitry may be located at a secondary Wireless Fidelity (Wi-Fi) module connected to a primary Wi-Fi module. Here, the primary Wi-Fi module is connected to the Ethernet switch. Receiving the data packet may further include receiving the data packet over the wired communication link at a local area network port connected to the Ethernet switch.

In some examples, when the IP address information does not include corresponding packet forwarding rules, the method includes forwarding the data packet from the Ethernet switch to a primary Wireless Fidelity (Wi-Fi) module connected to the Ethernet switch and executing, by data processing hardware at the primary Wi-Fi module, a packet forwarding process for the received data packet. The packet forwarding process may be configured to identify routing information for the received data packet based on the IP address information and determine the corresponding packet forwarding rules based on the routing information. The method may also include forwarding the packet forwarding rules and the data packet from the primary Wi-Fi module to the Ethernet switch. When the packet forwarding rules and the data packet are received by the Ethernet switch, the packet forwarding rules and the data packet may cause the Ethernet switch to perform the network address translation on the IP address information by mapping the source IP address from the private source IP address subnet to the public source IP address subnet, attaching the public source IP address subnet to the header of the data packet, and forwarding the data packet to the external network port of the network routing device.

In some implementations, the method includes, prior to forwarding the data packet from the Ethernet switch, flagging, by the Ethernet switch, the data packet. The flagged data packet may inform control circuitry at the primary Wi-Fi module to forward the data packet to the data processing hardware for executing the packet forwarding process on the data packet. Flagging the data packet may also include tagging a header of the data packet with a special bit recognizable by the control circuitry at the primary Wi-Fi module upon arrival of the data packet from the Ethernet switch. Forwarding the data packet from the Ethernet switch may further include forwarding the data packet to a dedicated port at control circuitry of the primary Wi-Fi module. The arrival of the data packet on the dedicated port may cause the control circuitry to forward the data packet to the data processing hardware for executing the packet forwarding process on the data packet.

The routing information may indicate at least one of the following: ports/interfaces for directing the data packet into and out of the network routing device; whether the source IP address and the destination IP address include the same or different IP address subnets; whether to allow or reject the data packet based on firewall rules; or network address translation information for the IP address information. The network routing device may not include a System-on-Chip subsystem.

Another aspect of the disclosure provides a method for routing packets of data. The method includes receiving, at a network routing device of a local network, a data packet from an external network. The data packet includes IP address information that includes a source IP address associated with the external network and a destination IP address associated with a user device in the local network. The method also includes determining, by an Ethernet switch of the network routing device, whether the IP address information includes corresponding packet forwarding rules. When the IP address information includes the corresponding packet forwarding rules, the method includes determining, by the Ethernet switch, whether the user device is connected to a wireless interface of the network routing device or a wired local area network port of the network routing device. When the user device is connected to the wired local area network port of the network routing device, the method includes: performing, by the Ethernet switch, network address translation on the IP address information by mapping the destination IP address from a public destination IP address subnet to a private destination IP address subnet; attaching, by the Ethernet switch, the private destination IP address subnet to the header of the data packet; and forwarding the data packet to the wired local area network port of the network routing device. The local area network port offers a wired communication link to the user device.

This aspect may include one or more of the following optional features. In some implementations, when the IP address information includes the packet forwarding rules and when the user device is connected to the wireless interface of the network routing device, the method includes forwarding the data packet from the Ethernet switch to a primary Wi-Fi module connected to the Ethernet switch and translating, by control circuitry at the primary Wi-Fi module, the destination IP address from the public destination IP address subnet to the private destination IP address subnet. The method may also include attaching, by the control circuitry, the private IP address subnet to the header of the data packet and forwarding the data packet from the control circuitry to the wireless interface. The wireless interface may include radio circuitry connected to the control circuitry and offering a wireless communication link to the user device.

Translating the destination IP address may include: stripping the public destination IP address subnet and payload from the data packet; storing, on memory hardware in communication with the control circuitry, the public destination IP address subnet and the payload; and retrieving, by the control circuitry, the private destination IP address subnet from the memory hardware. The radio circuitry may be located at the primary Wi-Fi module and coupled to a primary antenna array configured to transmit radio frequency signals over a 5 Gigahertz frequency band. In some examples, the radio circuitry is located at a secondary Wi-Fi module connected to the control circuitry of the primary Wi-Fi module, the radio circuitry coupled to a secondary antenna array configured to transmit radio frequency signals over a 2.4 Gigahertz frequency band.

In some implementations, when the IP address information does not include corresponding packet forwarding rules, the method includes forwarding the data packet from the Ethernet switch to a primary Wireless Fidelity (Wi-Fi) module connected to the Ethernet switch, executing, by data processing hardware at the primary Wi-Fi module, a packet forwarding process for the received data packet and determining, by the data processing hardware, whether the user device is connected to the wireless interface or the wired local area network port based on the routing information for the received packet. The packet forwarding process may be configured to identify routing information for the received data packet based on the IP address information and determine the corresponding packet forwarding rules based on the routing information. When the user device is connected to the wireless interface, the method may include offloading the packet forwarding rules onto control circuitry at the primary Wi-Fi module. When the packet forwarding rules are offloaded onto the control circuitry, the method may cause the control circuitry to: perform network address translation on the IP address information by translating the destination IP address from the public destination IP address subnet to the private destination IP address subnet; attach the private destination IP address subnet to the header of the data packet; and forward the data packet from the control circuitry to the wireless interface, the wireless interface comprising radio circuitry offering a wireless communication link to the user device.

The radio circuitry may be located at the primary Wi-Fi module and coupled to a primary antenna array configured to transmit radio frequency signals over a 5 Gigahertz frequency band. In some examples, the radio circuitry is located at a secondary Wi-Fi module connected to the control circuitry of the primary Wi-Fi module. The radio circuitry may be coupled to a secondary antenna array configured to transmit radio frequency signals over a 2.4 Gigahertz frequency band.

In some examples, when the user device is connected to the wired local area network port, the method includes forwarding the data packet from the primary Wi-Fi module back to the Ethernet switch and offloading, by the data processing hardware, the packet forwarding rules onto the Ethernet switch. When the packet forwarding rules are offloaded onto the Ethernet switch, the method causes the Ethernet to: perform the network address translation on the IP address information by mapping the source IP address from the private source IP address subnet to the public source IP address subnet; attach the private source IP address subnet to the header of the data packet; and forward the data packet to the wired local area network port. The routing information may indicate at least one of the following: ports/interfaces for directing the data packet into and out of the network routing device; whether the source IP address and the destination IP address include the same or different IP address subnets; whether to allow or reject the data packet based on firewall rules; or network address translation information for the IP address information.

Yet another aspect of the disclosure provides a network routing device. The device includes: a wide-area network (WAN) port; one or more local area network (LAN) ports; a multi-port Ethernet switch connected to the WAN port and the LAN ports; a primary Wireless Fidelity (Wi-Fi) module; and memory hardware in communication with the data processing hardware. The Wi-Fi module includes control circuitry connected to the Ethernet switch, primary radio circuitry connected to the control circuitry and coupled to a primary antenna array, and data processing hardware in communication with the control circuitry and the primary radio circuitry. The primary antenna array is configured to transmit/receive radio frequency signals over a first frequency band. The memory hardware stores instructions that when executed by the data processing hardware cause the data processing hardware to perform operations. The operations include receiving a data packet without known corresponding packet forwarding rules, executing a packet forwarding process for the data packet, determining whether the destination IP address is associated with a wireless connection to the network routing device or a wired connection to the network routing device, and offloading the packet forwarding rules onto the control circuitry of the primary Wi-Fi module and/or the Ethernet switch. The data packet includes internet protocol (IP) address information that includes a source IP address and the destination IP address. The packet forwarding process is configured to identify routing information for the received data packet based on the IP address information and determine corresponding packet forwarding rules based on the routing information.

This aspect may include one or more of the following optional features. In some implementations, the device includes at least one secondary Wi-Fi module connected to the control circuitry of the primary Wi-Fi module. The secondary Wi-Fi module may include secondary radio circuitry coupled to a secondary antenna array, the secondary antenna array may be configured to transmit/receive radio frequency signals over a second frequency band different than the first frequency band. The network routing device may not include a System-on-Chip subsystem.

In some examples, the Ethernet switch is configured to: receive the packet forwarding rules from the data processing hardware when the destination IP address is associated with the wired connection; apply the packet forwarding rules to a subsequent data packet having the same IP address information as the initial data packet; and forward the subsequent data packet to the WAN port or one of the wired LAN ports based on the packet forwarding rules. The Ethernet switch may be configured to apply network address translation on the IP address information of the subsequent data packet using network address translation information associated with the packet forwarding rules.

In some implementations, the control circuitry of the primary Wi-Fi module is configured to: receive the packet forwarding rules from the data processing hardware when the destination IP address is associated with the wireless connection; apply the packet forwarding rules to a subsequent data packet having the same IP address information as the initial data packet; and forward the subsequent data packet to one of the primary radio circuitry connected to the baseband circuitry or a secondary Wi-Fi module connected to the control circuitry based on the packet forwarding rules. The control circuitry may be configured to apply the packet forwarding rules by: stripping a public destination IP address subnet and payload from the data packet; storing, on the memory hardware, the public destination IP address subnet and the payload; retrieving a private destination IP address subnet from the memory hardware; and attaching the private destination IP address subnet to the header of the data packet. The routing information may indicate one of the following: ports/interfaces for directing the data packet into and out of the network routing device; whether the source IP address and the destination IP address include the same or different IP address subnets; whether to allow or reject the data packet based on firewall rules; and network address translation information for the IP address information. The network routing device may be configured to provide gigabit data transfer rates between a local network and an external network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Network routing devices (e.g., routers) that provide gigabit data transfer rates generally employ a System-on-Chip (SoC) dual-core processor subsystem to handle all routing functionality for communications between a private local network and a public external network (e.g., the Internet). While SoC dual-core processor subsystems provide the necessary processing power to achieve high bitrates, e.g., gigabit per second per port, the SoC subsystems drastically increase the material cost of the gigabit router. Wireless chipsets include associated auxiliary processors and firmware for establishing wireless communication links with user devices within the local network. Implementations herein are directed toward a gigabit router that does not employ a SoC dual-core processor subsystem, and instead executes firmware on auxiliary processor(s) of a Wireless Fidelity (Wi-Fi) module to leverage the functionality of a hardware accelerator (e.g., control circuitry/baseband circuitry) at the Wi-Fi module and/or the functionality of a multi-port Ethernet switch to handle routing activity for data packets in transient through the gigabit router. For instance, the auxiliary processor on the primary Wi-Fi module may off-load network address translation (NAT) and packet forwarding activity onto the hardware accelerator at the Wi-Fi module and/or the Ethernet switch.

Figure 1:
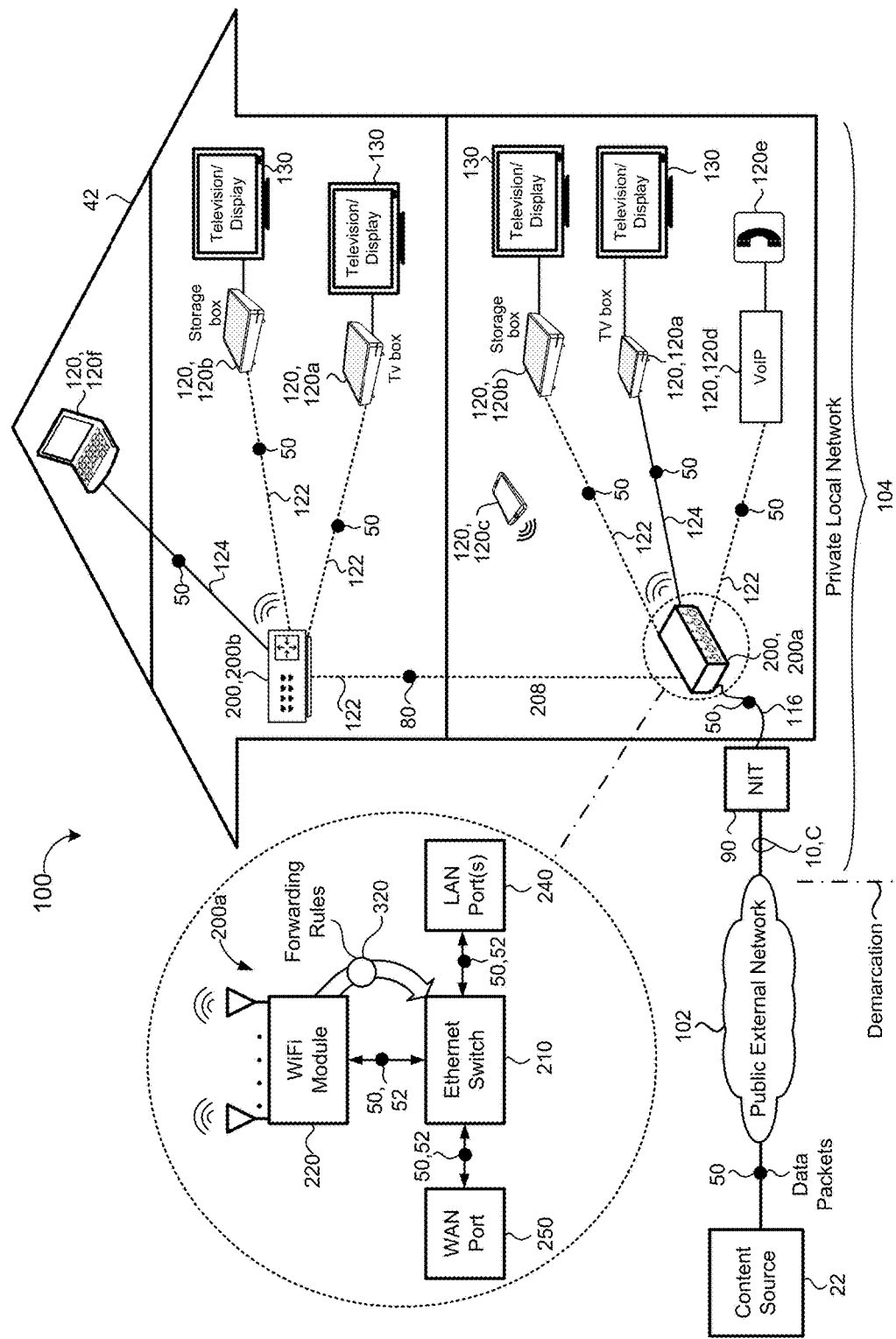
FIG. 1 is a schematic view of an example network system.

Referring to FIG. 1, in some implementations, a network system 100 includes a public external network 102 in communication with a private local network 104. The public network 102 (also referred to as an access network) delivers data packets 50 through communication links 10 between a content source 22 and the local network 104 associated with a customer premises 42 (e.g. house, building, or structure). The network system 100 may be associated with an optical fiber-to-the-home (FTTH), fiber-to-the-building (FTTB), fiber-to-the-node (FTTN), fiber-to-the-curb (FTTC), fiber-to-the-premises (FTTP), or simply FTTX system for delivering high speed, high bandwidth services for data 50 (e.g., as data packets).

The public network 102 may include an optical network (e.g., a passive optical network (PON) or a Gigabit-capable PON (GPON)) for communicating data packets 50 over the communication links 10 (e.g., fibers or line-of-sight free space optical communications) between the content source 22 and the local network 104. The content source 22 may include, without limitation, an internet data source, a voice data source, and/or a video media distribution source. The local network 104 may be interchangeably referred to as a "private network" or a "residential network".

In some implementations, a network interface terminal (NIT) 90 is installed outside the premises 42 and includes any type of signal conductor capable of directing incoming and outgoing data packets 50 between the public external network 102 and the private local network 104. In some examples, the NIT 90 includes an optical network unit (ONU) having an optical transceiver (transmitter/receiver) for transmitting and receiving the data packets 50 as optical signals to and from an optical transceiver at the content source 22. Additionally, the NIT 90 delivers data packets 50 from the public network 102 to a network routing device (NRD) 200, 200a within the building 42 that serves as an access point (e.g., wireless or wired connection) for the private local network 104. In some examples, a modem facilitates the delivery of data packets 50 between the public network 102 and the local network 104.

Customer premises equipment (CPE) is any terminal and associated equipment located at the premises (e.g., building) 42 of a user and connected to a carrier telecommunication channel C at a demarcation point. In the examples shown, the NIT 90 and the NRDs 200, 200a-b are CPEs. The demarcation point is established at a house, building, or complex to separate the customer equipment from the service provider equipment. CPE generally refers to devices such as telephones, routers, switches, residential gateways (RG), set-top boxes, fixed mobile convergence products, home networking adapters, or Internet access gateways that enable the user to access services of a communications service provider and distribute them around the building 42 of the user 40 via the local network 104.

In some examples, the NRD 200 of the local network 104 includes a gigabit router/repeater equipped with multiple Internet protocol (IP) interfaces. The building 42 may include one or more NRDs 200, 200a-b, each acting as an access point (e.g., wireless or wired connection) for the local network 104, for example, by offering Wireless Fidelity (Wi-Fi) connectivity (e.g., wireless communication links 122) to the local network 104 and/or by offering multiple wired connections 124 (e.g., wired communication links) capable of establishing connections with electronic devices 120. Therefore, each NRD 200 serves as a router or wireless extender/repeater to provide internet service to the devices 120 located within the premises 42 (e.g., building, house, office, etc.).

In some implementations, the local network 104 uses standard communications technologies and/or protocols. Thus, the network 104 can include links using technologies, such as Ethernet (e.g., 802.3), Wireless Fidelity (Wi-Fi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 104 can use custom and/or dedicated data communications technologies instead of, or in addition to, the ones described above.

In some implementations, the private local network 104 is a local area network (LAN) (e.g., a home area network (HAN)) that facilitates communication and interoperability among the one or more gigabit NRDs 200 and electronic devices 120 within a limited area 42 (e.g., building), such as a home, school, or office. For security over the local network 104, the NRD 200a may implement firewall rules to allow/reject data packets 50 into the local network 104. An electronic device 120 may be a TV box 120a, a storage box 120b, a tablet 120c, a voice-over-internet protocol (VoIP) device 120d, a phone or smartphone 120e, a computer 120f (or a laptop, a portable electronic device), etc., each of which may be a wireless connection 122 or a wired connection 124 to a router/repeater 200. The wireless connection 122, also referred to as wireless communication link 122, may include a wireless interface, such as an RG-45 Ethernet interface for 802.11 Wi-Fi. On the other hand, the wired connection 124 may include a coaxial interface, such as an RJ-45 interface.

The NRD 200 is also configured to perform network address translation (NAT) functions. In a typical configuration, the local network 104 uses one or more designated "private" IP address subnets and the NRD 200 connects to the external network 102 (e.g., the Internet) with a "public" address subnet assigned by an internet service provider (ISP). As traffic (e.g., data packets 50) passes from the private local network 104 to the public external network 102, the source IP address on the data packets 50 are translated while in transient through the NRD 200 from the private IP address subnet(s) to a public IP address subnet. On the other hand, data packets 50 arriving at the NRD 200 from the external network 102 include a public destination IP address that the NRD 200 translates/maps to a private destination IP address. Here, the data packets 50 may include a receiving port associated with a target electronic device 120 in the local network 104, and when the target electronic device 120 is listening on that receiving port, the NRD 200 will translate the destination IP address from the public destination IP address subnet to the private destination IP address subnet associated with the target electronic device 120 listening on the receiving port. Accordingly, NAT functions and firewall rules add improved security for the private local network 104 by concealing the identify of IP clients/user devices (i.e., electronic devices 120) in the local network 104.

In some examples, the NRD 200 uses single-user multiple-input multiple-output (SU-MIMO) beam forming configured to transmit/receive data packets 50 over a dedicated wireless communication link 122 to and from a single electronic device 120 at a time. In other examples, the NRD 200 uses multiple-user MIMO (MU-MIMO) beam forming configured to simultaneously transmit/receive data packets 50 over corresponding dedicated wireless communication links 122 to and from multiple electronic devices 120 within the building 42 in spatially diverse locations/positions. Accordingly, each NRD 200 serves as a node within the local network 104 for routing the data packets 50 to a target electronic device 120 directly or via one or more hops between the NRD 200 and the target electronic device 120.

The NRD 200a does not include a System-on-Chip (SoC) dual-core processor subsystem to configure, setup, and manage routing functionalities, such as, without limitation, gigabit Wi-Fi, gigabit Ethernet, network address translation (NAT), virtual Local Area Network (VLAN) segregation, traffic management, packet processing forwarding, and/or encryption. Instead, the NRD 200a leverages one or more auxiliary processors (e.g., data processing hardware 224 (FIG. 2)) and associated firmware (e.g., stored on memory hardware 230 (FIG. 2)) on a primary Wi-Fi module 220 for determining packet forwarding rules 320. The data packet 50 contains (i.e., in the packet header) IP address information 52 that includes at least a source IP address and a destination IP address. The IP address information 52 may additionally include receiving/transmitting ports and/or media access control (MAC) addresses associated with the source and/or destination IP addresses. The firmware may execute on the data processing hardware 224 to cause the data processing hardware 224 to execute a packet forwarding process 310 (FIG. 3A) configured to identify routing information 312 (FIG. 3A) for a received data packet 50 based on the corresponding IP address information 52 and determine the packet forwarding rules 320 based on the routing information 312. Thereafter, the data processing hardware 224 may offload the packet forwarding rules 320 on the primary Wi-Fi module 220 (for delivering data packets 50 over the wireless communication links 122) and/or an Ethernet switch 210 (for delivering data packets 50 over the wired connection 124 or out to the external network 102) so that subsequent data packets 50 associated with the same IP address information 52 can bypass future processing by the firmware.

In some examples, the packet forwarding rules 320 instruct the Ethernet switch 210 to perform NAT on incoming data packets 50 from the external network 102 that require routing through the local network 104. For instance, the Ethernet switch 210 may map the destination IP address from a public destination IP address subnet to a private destination IP address subnet for the residential network 104 and attach the private destination IP address subnet to the header of the data packet 50. For data packets 50 destined for the external network 102 (i.e., the Internet) from the local network 104, the packet forwarding rules 320 may instruct the Ethernet switch 210 to perform source NAT on the data packet 50 by mapping the source IP address from a private source IP address subnet to a public source IP address subnet. In other examples, the packet forwarding rules 320 instruct a baseband integrated circuit (BBIC) (i.e., control circuitry/hardware accelerator) at the Wi-Fi module 220 to perform NAT on incoming data packets 50 having a destination IP address in the residential network 104 wirelessly connected to the NRD 200. An example Ethernet switch 210 is the Qualcomm QCA8337N.

In the example shown, the primary Wi-Fi module 220 connects to the Ethernet switch 210 and the Ethernet switch 210 connects to a wide area network (WAN) port 250 (i.e., that provides access to the external network 102), and also connects to one or more LAN ports 240, each providing an associated wired connection 124 within the residential network 104. In some examples, the Ethernet switch 210 is a seven-port switch. The primary Wi-Fi module 220 may provide a wireless interface (i.e., wireless access point) configured to offer wireless connections 122 within the residential network 104. The primary Wi-Fi module 220 may also directly connect to one or more secondary Wi-Fi modules 236 (FIG. 2) via a Peripheral Component Interconnect Express (PCIe) bus, and thereby operate as a master to the secondary Wi-Fi modules 236 instead of requiring a SoC subsystem to operate as the master to the secondary Wi-Fi modules 236.

Figure 2:
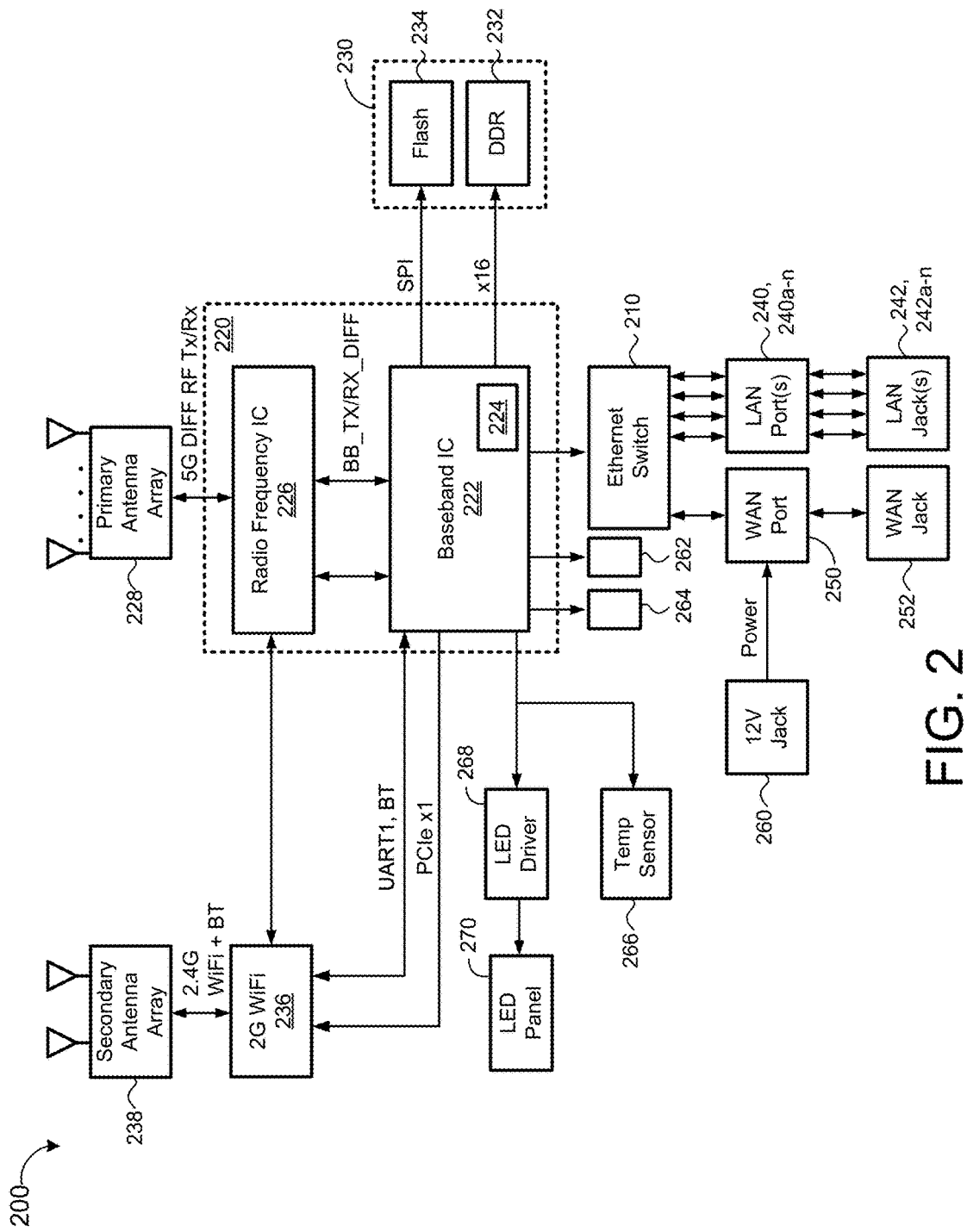
FIG. 2 is a schematic view of an example network routing device including a primary Wireless Fidelity (Wi-Fi) module connected to an Ethernet switch and a secondary Wi-Fi module.

FIG. 2 provides a schematic view of the NRD 200 including the Ethernet switch 210, the primary Wi-Fi module 220, memory hardware 230 in communication with the primary Wi-Fi module 220, and at least one secondary Wi-Fi module 236 connected to the primary Wi-Fi module 220. The components may reside on a printed circuit board (PCB) or other substrate. The NRD 200, however, does not include a SoC subsystem, and instead, leverages one or more auxiliary processors 224 (e.g., data processing hardware) associated with the Wi-Fi module 220 to configure, manage, and set up packet forwarding activity and other routing functions conventionally performed by SoC subsystems. In the example shown, the Wi-Fi module 220 includes the BBIC 222 (i.e., control circuitry) having the data processing hardware 224 and a primary radio frequency integrated circuit (RFIC) 226, e.g., an RF chip, in communication with the BBIC 222. The BBIC 222 may also be referred to as "control circuitry" that may function as a hardware accelerator for applying packet forwarding rules 320 for data packets 50 communicated over wireless communication links 122. The BBIC 222 is in communication with memory hardware 230 that may store instructions for execution by the data processing hardware 224 for executing the packet forwarding process 310 on one or more initial data packets 50 associated with a network session that do not include known or previously determined packet forwarding rules 320. Here, the packet forwarding process 310 determines the packet forwarding rules 320, as well as obtains configuration tables for mapping IP addresses from public subnets to private subnets and vice versa. For instance, the memory hardware 230 may include Double Data Rate (DDR) Synchronous Dynamic Random-Access Memory (SDRAM) 232 for offloading payload information from a received packet 50 and obtaining maps for translating IP addresses between public and private IP subnets. On the other hand, flash memory 234 may store the firmware for executing the packet forwarding process 310 on the data processing hardware 224 to determine the packet forwarding rules 320 associated with IP address information 52 contained in a received data packet 50.

The RFIC 226 may configure the data packet 50 on the five (5) Gigahertz (GHz) frequency band for wireless transmission out a primary antenna array 228 coupled to the RFIC 226. In some examples, the primary antenna array 228 includes four antennas. In other examples, the primary antenna array 228 includes less than four or more than four antennas. Moreover, the BBIC 222 may be connected to one or more secondary Wi-Fi modules 236 and serve as a master for each secondary Wi-Fi module 236. In the example shown, the BBIC 222 is connected to one secondary Wi-Fi module 236 associated with a legacy wireless chip set providing wireless communication on the 2.4 GHz frequency band via a secondary antenna array 238 coupled to a secondary RFIC located at the secondary Wi-Fi module 236. In some examples, the secondary antenna array 238 includes two antennas. Since the NRD 200 does not include a central SoC subsystem for controlling the secondary Wi-Fi module 236, the secondary Wi-Fi module 236 connects directly to the BBIC 222 of the primary Wi-Fi module 220 via the PCIe x1 bus to allow the primary Wi-Fi module 220 to provide beam training (BT) commands to the secondary Wi-Fi module 236 when wireless communication on the 2.4 GHz frequency band is desirable.

The BBIC 222 may also be in communication with a light emitting diode (LED) driver 268 and a temperature sensor 266 configured to measure an operating temperature of the NRD 200. The LED driver 268 may activate one or more LEDs on a LED panel 270 of the network routing device 200. The LED panel 270 functions as a visual indicator of operating states of the NRD 200. For instance, designated LEDs may illuminate to indicate the NRD 200 is powered, whether the NRD 200 is connected to the external network 102, whether network traffic is flowing into/out of the NRD 200, etc.

In some implementations, the Ethernet switch 210 is a multi-port switch connected to at least the external network port 250 (e.g., WAN port), one or more LAN ports 240, 240a-n (e.g., wired Ethernet ports), and the BBIC 222. The external network port 250 may be in communication with an associated external network jack 252 (e.g. WAN jack) configured to receive a cable 116 (e.g., RJ cable of FIG. 1) connected to the NIT 90 or a modem connecting the NRD 220 to the NIT 90. The external network port 250 may also be in communication with a power jack 260 (e.g., 12 Volt (V) jack) configured to receive power from an external power source (e.g., wall outlet) for powering the components of the NRD 200. In some examples, the NRD 200 includes four LAN ports 240. Each LAN port 240 is associated with a corresponding LAN jack 242, 242a-n configured to receive a first end of a cable having a second end connected to an electronic device 120 to connect the electronic device 120 to the local network 104. The Ethernet switch 210 may include one port connected to a crystal resonator (not shown).

Figure 3A:
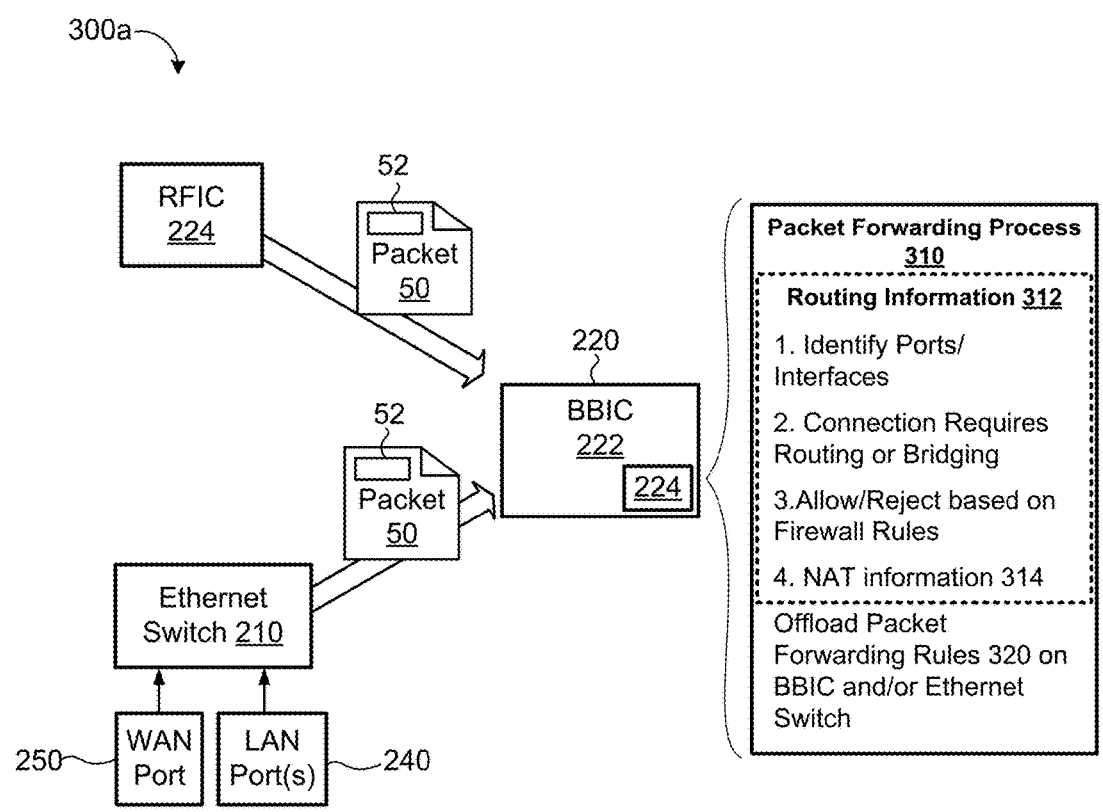
FIG. 3A is a schematic view showing data processing of the primary Wi-Fi module executing a packet forwarding process to determine packet forwarding rules for a data packet received by the network routing device of FIG. 2.
Figure 3B:
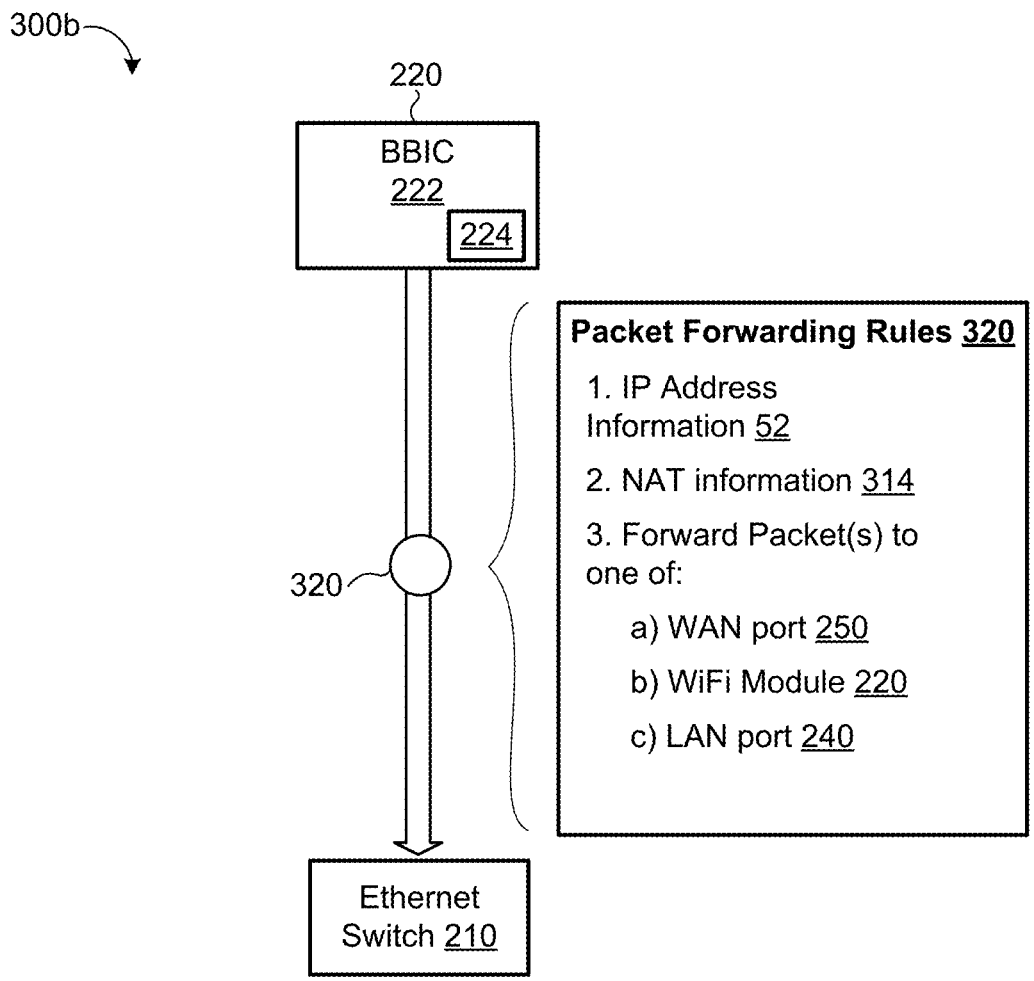
FIG. 3B is a schematic view showing the data processing hardware of the primary Wi-Fi module offloading packet forwarding rules onto the Ethernet switch of FIG. 2.

Referring to FIGS. 3A and 3B, schematic views 300a, 300b show the data processing hardware 224 at the primary Wi-Fi module 220 executing the packet forwarding process 310 (i.e., through the firmware stored on the memory hardware 230) based on IP address information 52 associated with a data packet 50 received at the NRD 200. One or more initial data packets 50 of a network session may flow through a slow path for processing by the firmware executing on the data processing hardware 224. In the example shown in FIG. 3A, the RFIC 226 (or the secondary Wi-Fi module 236) may wirelessly receive a data packet 50 from the local network 104 and forward the received data packet 50 to the BBIC 222. The BBIC 222 may pass the data packet 50 to the data processing hardware 224 for processing. Similarly, the Ethernet switch 210 may receive a data packet 50 from the external network 102 via the WAN port 250 or from the residential network 104 via a corresponding LAN port 240 and forward the received data packet 50 to the BBIC 222. The BBIC 222 may pass the data packet 50 to the data processing hardware 224 for processing. The data processing hardware 224 accesses the firmware from the memory hardware 230 (FIG. 2) to execute the packet forwarding process 310 to process the IP address information 52 contained in the received data packet 50 and determine the packet forwarding rules 320 for subsequent data packets 50 having the same IP address information 52. Accordingly, once the packet forwarding rules 320 are determined for the associated IP address information 52, the subsequent data packets 50 may bypass processing by the firmware and flow along a fast path for routing/bridging by at least one of the Ethernet switch 210 or the BBIC 222 configured to apply the packet forwarding rules 320. This fast path routing performed by the Ethernet switch 210 and/or the BBIC 222 increases the routing speed and latency of packet flow through the NRD 200 since processing through the use of firmware is bypassed.

The packet forwarding process 310 executing on the data processing hardware 224 of the primary Wi-Fi module 220 includes a decision algorithm configured to determine routing information 312 for the received data packet 50 based on the corresponding IP address information 52. In some examples, the routing information 312 identifies which two ports/interfaces the network session is between and whether to route or bridge the data packet 50. For instance, the packet forwarding process 310 may analyze the IP address information 52 to determine whether the network is transmitting or receiving over the wireless interface (including the RFIC 226 and/or the secondary Wi-Fi module 236), one or more LAN ports 240, and/or the WAN port 250. Moreover, the process 310 may determine that the network connection requires routing when the source IP address and the destination IP address are associated with two different IP subnets, or determine the connection requires bridging when the source IP address and the destination IP address are associated with the same IP subnet but different Ethernet Media Access Control (MAC) addresses. As used herein, a MAC address may include a physical address unique to a source node or a destination node. In some examples, the NRD 200 is the source node or the destination node. In some examples, the IP address information 52 includes source and/or destination MAC addresses. Additionally or alternatively, the IP address information 52 may also include transmitting/receiving ports associated with the source node and/or the destination node of the network connection.

Additionally or alternatively, the packet forwarding process 310 may determine routing information 312 indicating whether to allow or reject the data packet 50 based on firewall rules and/or whether the IP address information 52 requires NAT, and more specifically, determine whether the IP address information 52 requires destination NAT and/or source NAT for data packets passing between the external network 102 and the local network 104. Accordingly, the routing information 312 may provide NAT information 314 that includes rules for mapping/translating IP addresses from public IP address subnets to private IP address subnets, and vice versa.

After the decision algorithm (i.e., packet forwarding process 310) determines the routing information 312 for the received data packet 50, the packet forwarding process 310 programs/instructs the data processing hardware 224 at the BBIC 222 and/or the Ethernet switch 210 to allow all subsequent data packets 50 associated with the same IP address information 52 to bypass future processing by the firmware. In other words, the packet forwarding process 310 determines the packet forwarding rules 320 for the IP address information 52 based on the routing information 312 and provides/offloads the rules 320 onto the hardware accelerator at the BBIC 222 and/or the Ethernet switch 210 for handling the flow of all subsequent data packets 50 associated with the same IP address information 52 through the NRD 200.

FIG. 3B shows the BBIC 222 forwarding/offloading the packet forwarding rules 320 to the Ethernet switch 210. The packet forwarding rules 320 may identify the corresponding IP address information 52, that NAT information 314, and forwarding rules/instructions that designate which port/interface the Ethernet switch 210 should forward a data packet 50 to reach an intended destination. For instance, the Ethernet switch 210 may route/forward outgoing data packets 50 intended for the external network 102 (e.g., the Internet) to the WAN port 250, and may route/forward incoming data packets 50 intended for the local network 104 to a corresponding one of the Wi-Fi module 220 (for wireless communications) or one of the LAN ports 240 (for wired communications). In some examples, the NAT information 314 instructs the Ethernet switch 210 to perform NAT functions for incoming data packets 50 intended for a destination IP address in the local network 104 having a wired connection 124 to a corresponding LAN port 240 of the NRD 200. In other examples, the packet forwarding rules 320 instruct the Ethernet switch 210 to forward incoming data packets 50 intended for a destination IP address in the local network 104 wirelessly connected to the NRD 200 via one of the RFIC 226 or the secondary Wi-Fi module 236. In these examples, the packet forwarding rules 320 instruct the BBIC 222 (i.e., control circuitry) at the primary Wi-Fi module 220 to perform NAT functions for the incoming data packet 50 intended for the destination IP address in the residential network 104. For instance, the BBIC 222 may offload a payload of the incoming data packet 50 in the memory hardware 230, access the memory hardware 230 to map/translate the destination IP address contained in the IP address information 52 from the public destination IP address subnet to the private destination IP address subnet, and attach the private destination IP address to the header of the data packet 50 before providing the data packet 50 to the primary RFIC 226 or the secondary Wi-Fi module 236 for wireless transmission to the destination (i.e., target electronic device 120) in the residential network 104.

Figure 4:
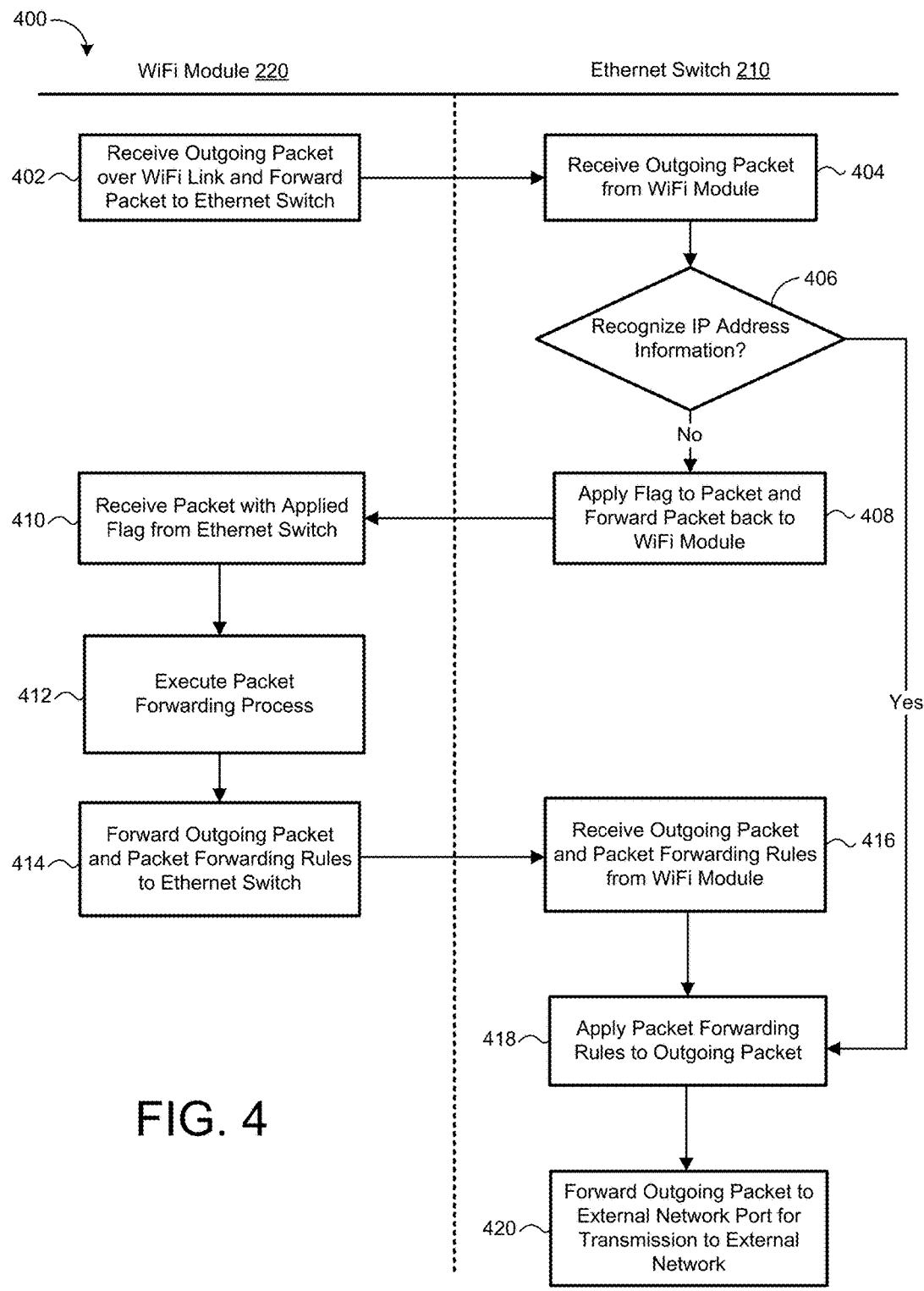
FIG. 4 is a schematic view of a diagram showing example operations performed by the primary Wi-Fi module and the Ethernet switch of FIG. 2 when the network routing device receives an outgoing data packet from a local network.

FIG. 4 is a schematic view of a diagram 400 showing example operations performed by the primary Wi-Fi module 220 and the Ethernet switch 210 of FIG. 2 when the NRD 200 receives an outgoing data packet 50 intended for the external network 102 from the residential network 104. At operation 402, the primary Wi-Fi module 220 receives an outgoing data packet 50 over a wireless link 122 from a user device 120 within the residential network 104. The primary Wi-Fi module 220 may receive the data packet 50 on the 5 GHz band via the primary antenna array 228 coupled to the RFIC 226 located at the primary Wi-Fi module 220, or on the 2.4 GHz band via the secondary antenna array 238 coupled to the secondary Wi-Fi module 236, which in turn is connected to the BBIC 222 at the Wi-Fi module 220. Thereafter, the BBIC 222 at the primary Wi-Fi module 220 may forward the outgoing data packet 50 to the Ethernet switch 210.

At operation 404, the Ethernet switch 210 receives the outgoing data packet 50 from the BBIC 222 located at the Wi-Fi module 220. The Ethernet switch 210 may similarly receive outgoing data packets 50 from a user device 120 within the residential network 104 having a wired connection 124 to a corresponding LAN port 240. At decision block 406, the Ethernet switch 210 determines whether or not the IP address information 52 contained in the outgoing data packet 50 is recognizable. As used herein, recognizable IP address information 52 refers to IP address information 52 having corresponding packet forwarding rules 320, thereby allowing the outgoing data packet 50 to bypass the packet forwarding process 310 and flow along the fast path.

When the Ethernet switch 210 recognizes the IP address information 52 contained in the outgoing data packet (i.e., decision block 406 is "Yes"), the Ethernet switch 210 applies, at operation 418, the corresponding packet forwarding rules 320 associated with the IP address information 52. In some examples, the Ethernet switch 210 performs NAT to translate some or all of the IP address information 52 from private IP address subnet(s) to public IP address subnet(s) since the outgoing data packet 50 is intended for the external network 102. For instance, the packet forwarding rules 320 may instruct the Ethernet switch 210 to map the source IP address from a private source IP address subnet applied by the local network 104 to a public source IP address subnet designated by the ISP to conceal the identify the user device 120 and/or the local network 104. Thereafter, the Ethernet switch 210 may attach the public source IP address subnet to the header of the outgoing data packet 50. At operation 420, the Ethernet switch 210 forwards the outgoing data packet 50 to the external network port (i.e., WAN port 250) for transmission to the external network 102.

On the other hand, when the Ethernet switch 210 does not recognize the IP address information 52 contained in the outgoing data packet 50 (i.e., decision block 406 is "No"), the Ethernet switch 210 flags, at operation 408, the outgoing data packet 50 and forwards the flagged data packet 50 back to the primary Wi-Fi module 220. At operation 410, the BBIC 222 (i.e., control circuitry) at the primary Wi-Fi module 220 receives the flagged data packet 50 from the Ethernet switch 210. Here, the flagged data packet 50 indicates that the data packet 50 is without known packet forwarding rules 320, and therefore requires, slow path processing by the firmware on the data processing hardware 224 through execution of the packet forwarding process 310. Accordingly, arrival of the flagged data packet 50 at the Wi-Fi module 220 informs the BBIC 222 to forward the data packet 50 to the data processing hardware 224 for executing the packet forwarding process 310 on the data packet 50 to determine the packet forwarding rules 320. In some examples, the Ethernet switch 210 flags the data packet 50 by tagging a header of the data packet 50 with a slow path processing bit recognizable by the BBIC 222 upon arrival of the data packet 50 from the Ethernet switch 210. Additionally or alternatively, the Ethernet switch 210 may forward the data packet 50 to a dedicated port at the BBIC 222, whereby the arrival of the packet 50 on the dedicated port causes the BBIC 222 to forward the packet 50 to the data processing hardware 224 for executing the packet forwarding process 310. In some examples, the Ethernet switch 210 adds an original source port for the header and forwards the data packet 50 to the Wi-Fi module 220 over a separate port to inform the Wi-Fi module 220 that the data packet 50 is without known packet forwarding rules 320.

At operation 412, the data processing hardware 224 at the primary Wi-Fi module 220 executes the packet forwarding process 310 for the flagged data packet 50 to identify the routing information 312 based on the IP address information 52 and determine the packet forwarding rules 320 based thereon. For instance, the firmware stored on the memory hardware 230 (e.g., flash memory 234) may execute on the data processing hardware 224 to determine the packet forwarding rules 320 associated with the IP address information 52. Thereafter, the primary Wi-Fi module 220 forwards, at operation 414, the outgoing data packet 50 and the corresponding packet forwarding rules 320 to the Ethernet switch 210 to complete the slow path processing of the flagged data packet. The Wi-Fi module 220 may forward the data packet 50 and the corresponding packet forwarding rules 320 in parallel or separately.

At operation 416, the Ethernet switch 210 receives the outgoing data packet 50 and the corresponding packet forwarding rules 320 from the primary Wi-Fi module 220, and at operation 418, applies the packet forwarding rules 310 to the outgoing data packet 50 as set forth above. At operation 420, the Ethernet switch 210 may forward the outgoing data packet 50 to the external network port 250. Accordingly, the Ethernet switch 210 may now direct all subsequently received outgoing data packets 50 having the same IP address information 52 along the fast path by simply applying the previously determined packet forwarding rules 320 at operation 418. Thus, offloading the packet forwarding rules 320 onto the Ethernet switch 210 allows subsequent data packets 50 with the same IP address information 52 to bypass the slow processing steps associated with operations 408-414 a. In some examples, operations 408-414 add a few hundred microseconds compared to scenarios when the IP address information 52 contained in the packet 50 is associated with known/recognized packet forwarding rules 320.

In some implementations, a data packet 50 may be destined for the NRD 200 rather than a destination node of the external network 102 or the residential network 104. For instance, the NRD 200 may host Dynamic Name Server (DNS) actions and/or Dynamic Host Configuration Protocol (DHCP) actions performed on the data packet 50. Here, the data packet 50 may include the MAC address of the NRD 200 as a destination MAC address and the IP address of the NRD as the destination IP address. In these implementations, the data packet 50 is flagged and forwarded to the Wi-Fi module 220 at operations 408,410, and then undergoes slow path processing at operation 412 without reverting back to the Ethernet switch 210.

Figure 5A:
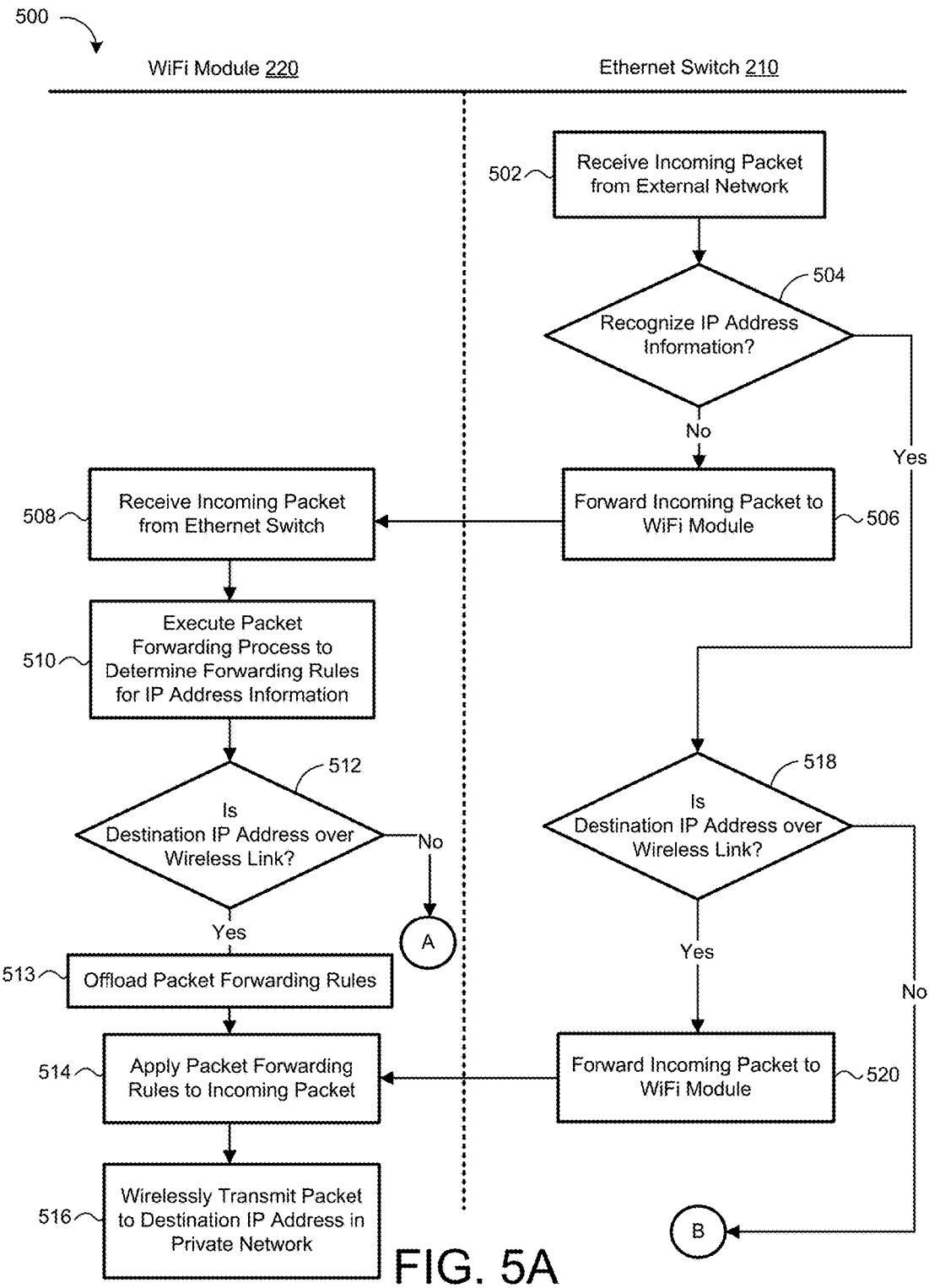
FIGS. 5A and 5B are schematic views of a diagram showing example operations performed by the primary Wi-Fi module and the Ethernet switch of FIG. 2 when the network routing device receives an incoming data packet from an external network.
Figure 5B:
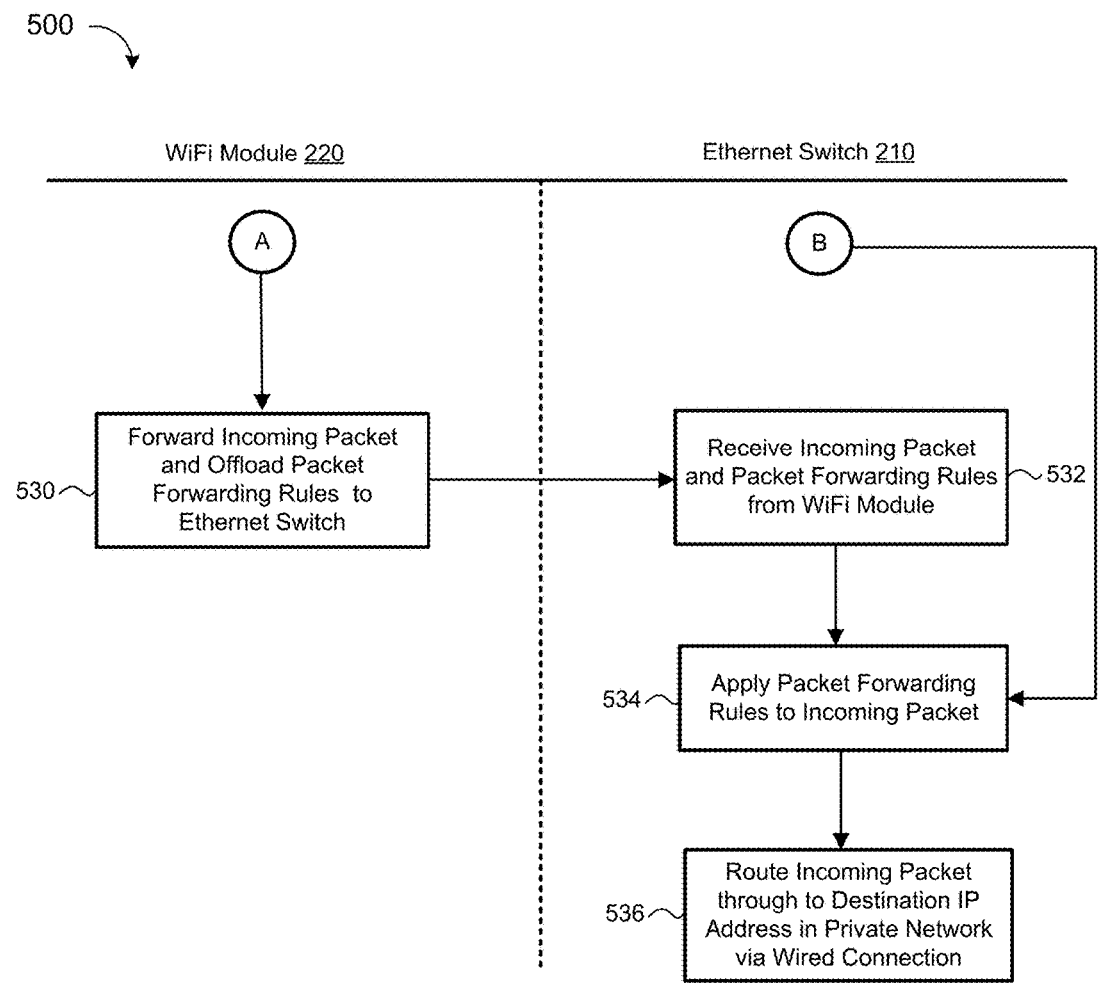

FIGS. 5A and 5B are schematic views of a diagram 500 showing example operations performed by the primary Wi-Fi module 220 and the Ethernet switch 210 of FIG. 2 when the NRD 200 receives an incoming data packet 50 intended for the local network 104 from the external network 102. The data packet 50 includes IP address information 52 that includes a source IP address in the external network 102 and a destination IP address associated with a user device 120 in the local network 104. The destination IP address may include a public IP address subnet assigned by the ISP to conceal the identity of the user device 120. In some examples, the IP address information 52 also contains a receiving port associated with the user device 120 so that the user device 120 may listen for the arrival of the data packet 50 on the receiving port. At operation 502, the Ethernet switch 210 receives the incoming data packet 50 from the external network port 250 (e.g., WAN port) and determines, at decision block 504, whether or not the IP address information 52 contained in the incoming data packet 50 is recognizable (i.e., whether the IP address information 52 has corresponding known packet forwarding rules 320).

When the IP address information 52 is recognizable (i.e., decision block 504 is "Yes"), the Ethernet switch 210 then determines, at decision block 518, whether the user device 120 is connected to a wireless interface of the NRD 200 or one of the wired LAN ports 240 of the NRD 200. When the user device 120 is connected to one of the wired LAN ports 240 (i.e., decision block 518 is "No"), the diagram proceeds to "B" and the Ethernet switch 210 applies, at operation 534 (FIG. 5B), the corresponding packet forwarding rules 320 associated with the IP address information 52. In some examples, the Ethernet switch 210 performs NAT to translate some or all of the IP address information 52 from public IP address subnet(s) to private IP address subnet(s) since the incoming data packet 50 is passing from the public external network 102 to the private local network 104. For instance, the packet forwarding rules 320 may instruct the Ethernet switch 210 to map the destination IP address from a public destination IP address subnet designated by the ISP to a private destination IP address subnet applied by the local network 104. Thereafter, the Ethernet switch 210 may attach the private destination IP address subnet to the header of the incoming data packet 50. At operation 536, the Ethernet switch 210 forwards the data packet 50 to the corresponding wired LAN port 240 for transmission to the user device 120. Accordingly, the offloading the packet forwarding rules 320 onto the Ethernet switch 210 allows a data packet received at the WAN port 250 to flow through the Ethernet switch 210 and out the corresponding wired LAN port 240 without flowing through a CPU/processor and associated memory.

Figure 6A:
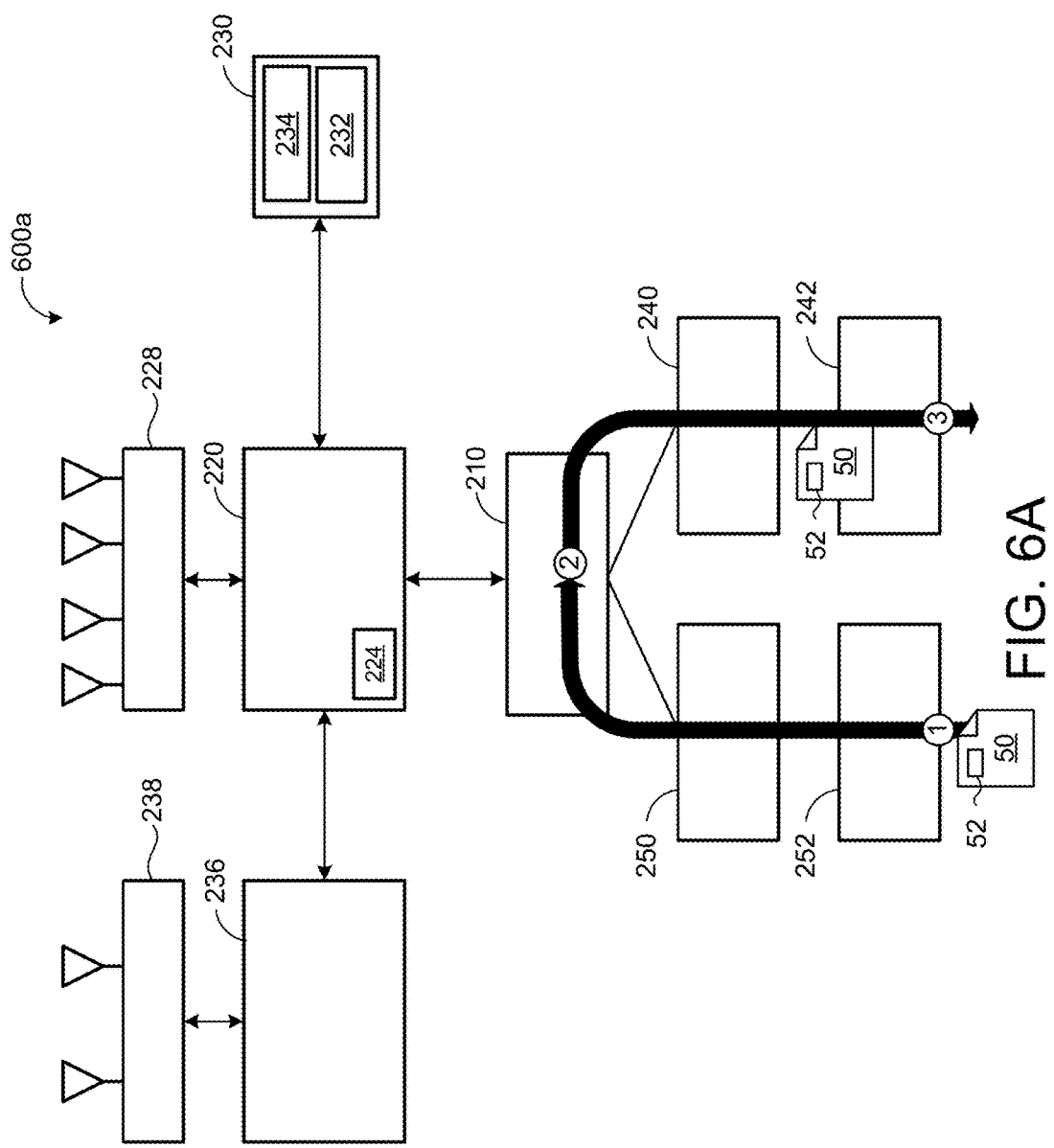
FIG. 6A is a schematic view showing the flow of a data packet through the network routing device of FIG. 2 when the Ethernet switch applies packet forwarding rules to the data packet.

Referring to FIG. 6A, a schematic view 600a of the NRD 200 shows packet flow of an incoming data packet 50 from the external network 102 intended for the local network 104 via one of the LAN ports 240 when the IP address information 52 includes the corresponding packet forwarding rules 320 (i.e., decision block 504 is "Yes" and decision block 518 is "No"). At time "1", the external network jack 252 (e.g., WAN jack) receives the incoming data packet 50 from the external network 102. For instance, the external network jack 252 may connect to the NIT 90 directly, or indirectly through a modem, via the cable 116 (e.g., RJ cable) to receive the data packet 50 from the external network 102. The data packet 50 contains the IP address information 52. The data packet 50 flows from the external network jack 252 through the external network port 250 (e.g., WAN port) and to the Ethernet switch 210.

At time "2", the Ethernet switch 210 determines that the IP address information 52 includes corresponding packet forwarding rules 320. For instance, the packet forwarding rules 320 may provide NAT information 314 and instructions to forward the data packet 50 to a corresponding LAN port 240 that offers the wired connection 124 to the user device 120 in the local network 104 associated with the destination IP address. In the example shown, the Ethernet switch 210 performs network address translation on the data packet 50 by mapping the destination IP address from the public destination IP address subnet (i.e., the IP address subnet provided by the ISP) to the private destination IP address subnet applied by the local network 104. Thereafter, the Ethernet switch 210 forwards the data packet 50 through the corresponding LAN port 240 and associated LAN jack 242 for transmission to the target user device 120 in the local network 104 via the wired connection 124. Accordingly, the data packet 50 flows along the "fast path" without undergoing any processing at a central processor or flowing through any memory.

On the other hand, referring back to FIG. 5A, when the user device 120 is connected to the wireless interface via the primary RFIC 226 or the secondary Wi-Fi module 236 (i.e., decision block 518 is "Yes"), the Ethernet switch 210 forwards, at operation 520, the incoming data packet 50 to the Wi-Fi module 220. Upon arrival of the data packet 50 at the primary Wi-Fi module 220 from the Ethernet switch 210, the BBIC 222 at the primary Wi-Fi module 220 employs the corresponding hardware accelerator to apply the corresponding packet forwarding rules 320 on the data packet 50 at operation 514. Here, the BBIC 222 may perform NAT to translate the IP address information 52 by translating the destination IP address from the public destination IP address subnet designated by the ISP to the private destination IP address subnet applied by the local network 104. Thereafter, the BBIC 222 (i.e., control circuitry) attaches the private destination IP address subnet to the header of the incoming data packet 50, and at operation 516, provides the data packet 50 to the RFIC 226 or the secondary Wi-Fi module 236 for wireless transmission to the user device 120 in the local network 104.

In some implementations, the translating of the destination IP address by the BBIC 222 includes the BBIC 222 stripping the public destination IP address subnet and payload from the data packet 50, storing the destination IP address subnet and the payload on the memory hardware 230 (e.g., DDR 232), and retrieving the private destination IP address subnet from the memory hardware 230. The packet forwarding rules 320 may additionally instruct the BBIC 222 to strip an 802.3 wired Ethernet header from the data packet 50 and attach a corresponding 802.11 Wi-Fi header before providing the packet 50 to the RFIC 226 or the secondary Wi-Fi module 236. For instance, the BBIC 222 may attach an 802.11ac Wi-Fi header to the packet 50 when the packet is to wirelessly transmit over the 5 GHz band from the primary antenna array 228 coupled to the RFIC 226. Similarly, the BBIC may attach an 802.11n header to the packet 50 when the packet 50 is to wirelessly transmit over the 2.4 GHz frequency band from the secondary antenna array 238 coupled to the secondary Wi-Fi module 236.

Figure 6B:
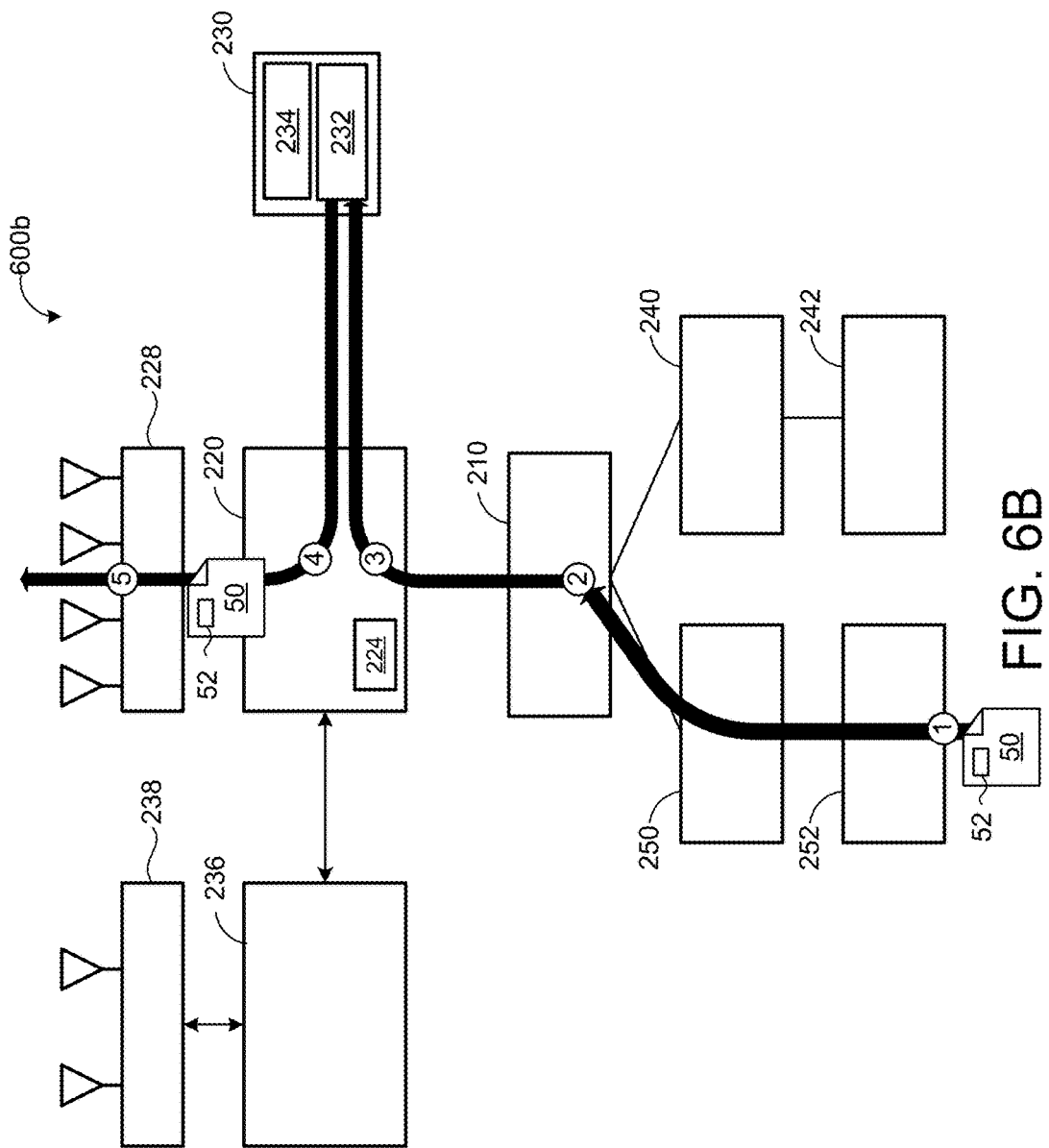
FIG. 6B is a schematic view showing the flow of a data packet through the network routing device of FIG. 2 when the Ethernet switch and the primary Wi-Fi module apply packet forwarding rules to the data packet.

Referring to FIG. 6B, a schematic view 600b of the NRD 200 shows packet flow of an incoming data packet 50 from the external network 102 intended for the local network 104 via the wireless interface (one of the primary RFIC 226 or the secondary wireless module 236) when the IP address information 52 includes corresponding packet forwarding rules 320 (i.e., decision block 504 is "Yes" and decision block 518 is "Yes"). At time "1", the external network jack 252 (e.g., WAN jack) receives the incoming data packet 50 containing the IP address information 52, and the data packet 50 passes through the external network port 250 (e.g., WAN port) to the Ethernet switch 210.

At time "2", the Ethernet switch 210 determines that the IP address information 52 includes corresponding packet forwarding rules 320. In the example shown, the packet forwarding rules 320 indicate that the target user device 120 associated with the destination IP address is connected to the wireless interface of the NRD 200 (i.e., via the primary RFIC 226 or the secondary Wi-Fi module 236). Accordingly, the Ethernet switch 210 forwards the incoming data packet 50 to the primary Wi-Fi module 220.

Upon arrival of the data packet 50 at the primary Wi-Fi module 220 from the Ethernet switch 210 at time "3", the hardware accelerator (e.g., BBIC 222/control circuitry) at the primary Wi-Fi module 220 performs network translation on the data packet 50 by translating the destination IP address from the public destination IP address subnet to the private destination IP address subnet. Here, the data packet 50 passes through the memory hardware 230 (e.g., the DDR memory 232) to strip the payload and the public destination IP address subnet, retrieve the corresponding private destination IP address subnet, and attach the private destination IP address subnet to the header of the data packet 50. In some examples, the primary Wi-Fi module 220 strips the 802.3 wired Ethernet header from the data packet 50 and attaches a corresponding 802.11 Wi-Fi header before providing the packet 50 to the RFIC 226 or the secondary Wi-Fi module 236

The data packet 50 flows from the memory hardware 230 back to the primary Wi-Fi module 220 at time "4", whereby the packet forwarding rules 320 instruct the hardware accelerator at the primary Wi-Fi module 220 to forward the data packet 50 to the wireless interface. In the example shown, the wireless interface includes the primary RFIC 226 located at the primary Wi-Fi module 220 and coupled to the primary antenna array 228 configured to transmit the RF signals over the 5 GHz frequency band. At time "5", the data packet 50 wirelessly transmits over the 5 GHz frequency band from the primary antenna array 228 to the target user device 120 in the local network 104. In other examples, the Wi-Fi module 220 may forward the data packet 50 to the secondary Wi-Fi module coupled to the secondary antenna array 238 configured to transmit RF signals over the 2.4 GHz frequency band.

Referring back to decision block 504 of FIG. 5A, when the Ethernet switch 210 does not recognize the IP address information 52 (i.e., decision block 504 is "No"), the Ethernet switch 210 forwards, at operation 506, the incoming data packet 50 to the Wi-Fi module 220, and at operation 508, the BBIC 222 at the Wi-Fi module 220 receives the incoming data packet 50 from the Ethernet switch 210. In these scenarios, the data packet 50 may be associated with an initial data packet 50 for a network connection, and therefore, requires slow path processing to identify the routing information 312 and determine the packet forwarding rules 320 based on the routing information 312. In some examples, the Ethernet switch 210 flags the data packet 50 to inform the BBIC 222 to forward the flagged data packet 50 to the data processing hardware 224 for executing the packet forwarding process 310. The flagging of the data packet 50 by the Ethernet switch 210 is described above with reference to operation 408 of FIG. 4.

At operation 510, the data processing hardware 224 at the primary Wi-Fi module 220 executes the packet forwarding process 310 for the data packet 50 to identify the routing information 312 based on the IP address information 52 and determines the packet forwarding rules 310 based thereon. For instance, the firmware stored on the memory hardware 230 (e.g., flash memory 234) may execute on the data processing hardware 224 to determine the packet forwarding rules 320 associated with the IP address information 52. Thereafter, the primary Wi-Fi module 220 determines, at decision block 512, whether the user device 120 is connected to the wireless interface of the NRD 200 or one of the wired LAN ports 240 of the NRD 200. When the user device 120 is connected to the wireless interface via the primary RFIC 226 or the secondary Wi-Fi module 236 (i.e., decision block 512 is "Yes"), the data processing hardware 224 offloads, at operation 513, the packet forwarding rules 320 associated with the IP address information 52 onto the BBIC 222. Thereafter, the BBIC 222 may employ the corresponding hardware accelerator to apply the corresponding packet forwarding rules 320 on the data packet 50 at operation 514.

Conversely, when the user device 120 is connected to one of the wired LAN ports 240 (i.e., decision block 512 is "No"), the diagram proceeds to "A" and the data processing hardware 224 forwards, at operation 530 (FIG. 5B), the incoming data packet 50 to the Ethernet switch 210 and offloads the packet forwarding rules 320 associated with the IP address information 52 onto the Ethernet switch 210. The forwarding of the data packet 50 and the offloading of the rules 320 may occur in parallel, or in any consecutive order. At operation 532, the Ethernet switch 210 receives the incoming data packet 50 and the packet forwarding rules 320 from the Wi-Fi module 220, and at operation 534, applies the packet forwarding rules 320 to the incoming data packet 50, as discussed above.

Figure 7:
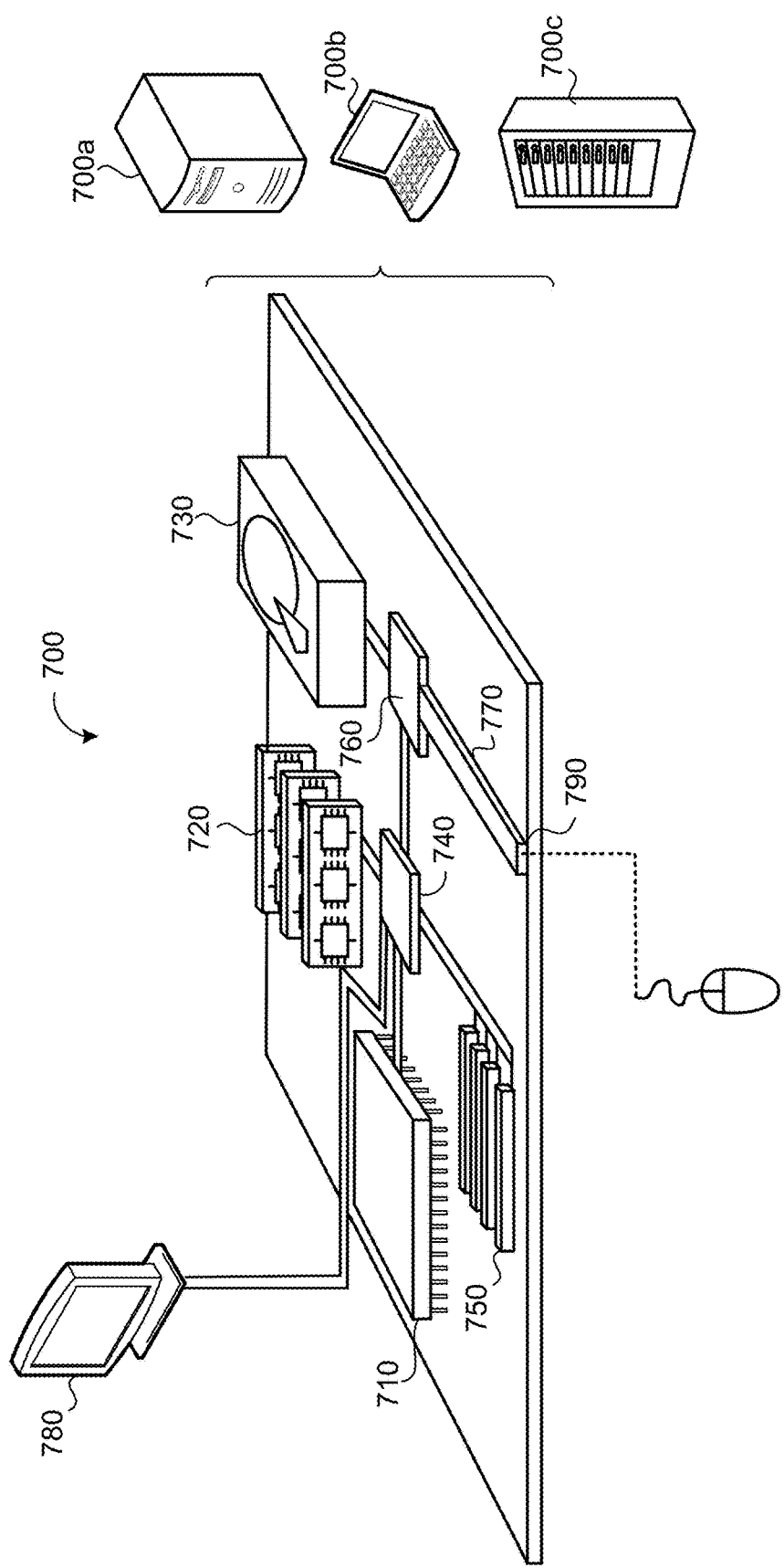
FIG. 7 is schematic view of an example computing device that may be used to implement the systems and methods described in this document.

FIG. 7 is a schematic view of an example control hardware 700 in communication with memory hardware 702 that may be used to implement the systems and methods described in this document. The control hardware 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 700 includes a processor 710, memory 720, a storage device 730, a high-speed interface/controller 740 connecting to the memory 720 and high-speed expansion ports 750, and a low speed interface/controller 560 connecting to low speed bus 570 and storage device 730. Each of the components 710, 720, 730, 740, 750, and 560, are interconnected using various busses, and may be mounted on a common motherboard or in other manners as appropriate. The processor 710 can process instructions for execution within the control hardware 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple control hardware 700 may be connected, with each device providing portions of the necessary operations (e.g., as a server bank, a group of blade servers, or a multi-processor system).

The memory 720 stores information non-transitorily within the control hardware 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the control hardware 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 740 is coupled to the storage device 730 and low-speed expansion port 760. The low-speed expansion port 760, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The control hardware 700 may be implemented in a number of different forms, as shown in the figure. For example, it may be implemented as a standard server 700a or multiple times in a group of such servers 700a, as a laptop computer 700b, or as part of a rack server system 700c. The control hardware 700 may implement data processing hardware 224 and the BBIC 222 at the primary Wi-Fi module 220. The control hardware 700 may be in communication with the memory hardware 702.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at a network routing device of a local network, a data packet over one of a wireless communication link or a wired communication link from a user device in the local network, the data packet comprising internet protocol (IP) address information, the IP address information including a source IP address associated with the user device and a destination IP address associated with an external network;
   determining, by an Ethernet switch of the network routing device, whether the IP address information includes corresponding packet forwarding rules;
   when the IP address information includes corresponding packet forwarding rules:
      performing, by the Ethernet switch, network address translation on the IP address information by mapping the source IP address from a private source IP address subnet to a public source IP address subnet;
      attaching, by the Ethernet switch, the public source IP address subnet to the header of the data packet; and
      forwarding the data packet from the Ethernet switch to an external network port, the external network port configured to connect the network routing device to the external network; and
   when the IP address information does not include corresponding packet forwarding rules:
      forwarding the data packet from the Ethernet switch to a primary Wireless Fidelity (Wi-Fi) module connected to the Ethernet switch;
      executing, by data processing hardware at the primary Wi-Fi module, a packet forwarding process for the received data packet, the packet forwarding process configured to identify routing information for the received data packet based on the IP address information and determine the corresponding packet forwarding rules based on the routing information; and
      forwarding the packet forwarding rules and the data packet from the primary Wi-Fi module to the Ethernet switch, the packet forwarding rules and the data packet when received by the Ethernet switch, causing the Ethernet switch to perform the network address translation on the IP address information by mapping the source IP address from the private source IP address subnet to the public source IP address subnet.

2. The method of claim 1, wherein receiving the data packet comprises receiving the data packet over the wireless communication link at radio circuitry coupled to a primary antenna array configured to transmit and receive radio frequency signals over a 5 Gigahertz frequency band, the radio circuitry located at the primary Wi-Fi module connected to the Ethernet switch.

3. The method of claim 1, wherein receiving the data packet comprises receiving the data packet over the wireless communication link at radio circuitry coupled to a secondary antenna array configured to transmit and receive radio frequency signals over a 2.4 Gigahertz frequency band, the radio circuitry located at a secondary Wi-Fi module connected to the primary Wi-Fi module.

4. The method of claim 1, wherein receiving the outgoing data packet comprises receiving the data packet over the wired communication link at a one or more local area network ports connected to the Ethernet switch.

5. A method comprising:
   receiving, at a network routing device of a local network, a data packet over one of a wireless communication link or a wired communication link from a user device in the local network, the data packet comprising internet protocol (IP) address information, the IP address information including a source IP address associated with the user device and a destination IP address associated with an external network;
   determining, by an Ethernet switch of the network routing device, whether the IP address information includes corresponding packet forwarding rules;
   when the IP address information includes corresponding packet forwarding rules:
      performing, by the Ethernet switch, network address translation on the IP address information by mapping the source IP address from a private source IP address subnet to a public source IP address subnet;
      attaching, by the Ethernet switch, the public source IP address subnet to the header of the data packet; and forwarding the data packet from the Ethernet switch to an external network port, the external network port configured to connect the network routing device to the external network; and when the IP address information does not include corresponding packet forwarding rules:
  forwarding the data packet from the Ethernet switch to a primary Wireless Fidelity (Wi-Fi) module connected to the Ethernet switch;
  executing, by data processing hardware at the primary Wi-Fi module, a packet forwarding process for the received data packet, the packet forwarding process configured to identify routing information for the received data packet based on the IP address information and determine the corresponding packet forwarding rules based on the routing information; and
  forwarding the packet forwarding rules and the data packet from the primary Wi-Fi module to the Ethernet switch, the packet forwarding rules and the data packet when received by the Ethernet switch, causing the Ethernet switch to:
    perform the network address translation on the IP address information by mapping the source IP address from the private source IP address subnet to the public source IP address subnet;
    attach the public source IP address subnet to the header of the data packet; and
    forward the data packet to the external network port of the network routing device.

6. The method of claim 5, further comprising, prior to forwarding the data packet from the Ethernet switch to the primary Wi-Fi module, flagging, by the Ethernet switch, the data packet, the flagged data packet informing control circuitry at the primary Wi-Fi module to forward the data packet to the data processing hardware for executing the packet forwarding process on the data packet.

7. The method of claim 6, wherein flagging the data packet comprises tagging a header of the data packet with a special bit recognizable by the control circuitry at the primary Wi-Fi module upon arrival of the data packet from the Ethernet switch.

8. The method of claim 5, wherein forwarding the data packet from the Ethernet switch to the primary Wi-Fi module comprises forwarding the data packet to a dedicated port at control circuitry of the primary Wi-Fi module, the arrival of the data packet on the dedicated port causing the control circuitry to forward the data packet to the data processing hardware for executing the packet forwarding process on the data packet.

9. The method of claim 5, wherein the routing information indicates at least one of the following:
  ports/interfaces for directing the data packet into and out of the network routing device;
  whether the source IP address and the destination IP address include the same or different IP address subnets;
  whether to allow or reject the data packet based on firewall rules; or
  network address translation information for the IP address information.

10. The method of claim 1, wherein in the network routing device does not include a System-on-Chip subsystem.

11. A method comprising:
  receiving, at a network routing device of a local network, a data packet from an external network, the data packet comprising internet protocol (IP) address information, the IP address information including a source IP address associated with the external network and a destination IP address associated with a user device in the local network;
  determining, by an Ethernet switch of the network routing device, whether the IP address information includes corresponding packet forwarding rules;
  when the IP address information includes the corresponding packet forwarding rules, determining, by the Ethernet switch, whether the user device is connected to a wireless interface of the network routing device or a wired local area network port of the network routing device;
  when the user device is connected to the wired local area network port of the network routing device:
    performing, by the Ethernet switch, network address translation on the IP address information by mapping the destination IP address from a public destination IP address subnet to a private destination IP address subnet;
    attaching, by the Ethernet switch, the private destination IP address subnet to the header of the data packet; and
    forwarding the data packet to the wired local area network port of the network routing device, the wired local area network port offering a wired communication link to the user device; and
  when the user device is connected to the wireless interface of the network routing device:
    forwarding the data packet from the Ethernet switch to a primary Wi-Fi module connected to the Ethernet switch;
    translating, by control circuitry at the primary Wi-Fi module, the destination IP address from the public destination IP address subnet to the private destination IP address subnet;
    attaching, by the control circuitry, the private IP address subnet to the header of the data packet; and
    forwarding the data packet from the control circuitry to the wireless interface, the wireless interface comprising radio circuitry connected to the control circuitry and offering a wireless communication link to the user device.

12. The method of claim 11, wherein translating the destination IP address comprises:
  stripping the public destination IP address subnet and payload from the data packet;
  storing, on memory hardware in communication with the control circuitry, the public destination IP address subnet and the payload; and
  retrieving, by the control circuitry, the private destination IP address subnet from the memory hardware.

13. The method of claim 11, wherein the radio circuitry is located at the primary Wi-Fi module and coupled to a primary antenna array configured to transmit radio frequency signals over a 5 Gigahertz frequency band.

14. The method of claim 11, wherein the radio circuitry is located at a secondary Wi-Fi module connected to the control circuitry of the primary Wi-Fi module, the radio circuitry coupled to a secondary antenna array configured to transmit radio frequency signals over a 2.4 Gigahertz frequency band.

15. A method comprising:
  receiving, at a network routing device of a local network, a data packet from an external network, the data packet comprising internet protocol (IP) address information, the IP address information including a source IP address associated with the external network and a destination IP address associated with a user device in the local network;

determining, by an Ethernet switch of the network routing device, whether the IP address information includes corresponding packet forwarding rules;

when the IP address information includes the corresponding packet forwarding rules:
  determining, by the Ethernet switch, whether the user device is connected to a wireless interface of the network routing device or a wired local area network port of the network routing device; and
  when the user device is connected to the wired local area network port of the network routing device:
    performing, by the Ethernet switch, network address translation on the IP address information by mapping the destination IP address from a public destination IP address subnet to a private destination IP address subnet;
    attaching, by the Ethernet switch, the private destination IP address subnet to the header of the data packet; and
    forwarding the data packet to the wired local area network port of the network routing device, the wired local area network port offering a wired communication link to the user device; and when the IP address information does not include corresponding packet forwarding rules:
  forwarding the data packet from the Ethernet switch to a primary Wireless Fidelity (Wi-Fi) module connected to the Ethernet switch;
  executing, by data processing hardware at the primary Wi-Fi module, a packet forwarding process for the received data packet, the packet forwarding process configured to identify routing information for the received data packet based on the IP address information and determine the corresponding packet forwarding rules based on the routing information;
  determining, by the data processing hardware, whether the user device is connected to the wireless interface or the wired local area network port based on the routing information for the received packet; and
  when the user device is connected to the wireless interface, offloading the packet forwarding rules onto control circuitry at the primary Wi-Fi module, the packet forwarding rules when offloaded onto the control circuitry causing the control circuitry to:
    perform network address translation on the IP address information by translating the destination IP address from the public destination IP address subnet to the private destination IP address subnet;
    attach the private destination IP address subnet to the header of the data packet; and
    forward the data packet from the control circuitry to the wireless interface, the wireless interface comprising radio circuitry offering a wireless communication link to the user device.

16. The method of claim 15, wherein the radio circuitry is located at the primary Wi-Fi module and coupled to a primary antenna array configured to transmit radio frequency signals over a 5 Gigahertz frequency band.

17. The method of claim 15, wherein the radio circuitry is located at a secondary Wi-Fi module connected to the control circuitry of the primary Wi-Fi module, the radio circuitry coupled to a secondary antenna array configured to transmit radio frequency signals over a 2.4 Gigahertz frequency band.

18. The method of claim 15, further comprising, when the user device is connected to the wired local area network port:
  forwarding the data packet from the primary Wi-Fi module back to the Ethernet switch; and
  offloading, by the data processing hardware, the packet forwarding rules onto the Ethernet switch, the packet forwarding rules when offloaded onto the Ethernet switch causing the Ethernet switch to:
    perform the network address translation on the IP address information by mapping the source IP address from the private source IP address subnet to the public source IP address subnet; and
    attach the private source IP address subnet to the header of the data packet; and
    forward the data packet to the wired local area network port.

19. The method of claim 15, wherein the routing information indicates at least one of the following:
  ports/interfaces for directing the data packet into and out of the network routing device;
  whether the source IP address and the destination IP address include the same or different IP address subnets;
  whether to allow or reject the data packet based on firewall rules; or
  network address translation information for the IP address information.

20. A network routing device comprising:
  a wide-area network (WAN) port;
  one or more local area network (LAN) ports;
  a multi-port Ethernet switch connected to the WAN port and the LAN ports;
  a primary Wireless Fidelity (Wi-Fi) module comprising:
    control circuitry connected to the Ethernet switch;
    primary radio circuitry connected to the control circuitry and coupled to a primary antenna array, the primary antenna array configured to transmit/receive radio frequency signals over a first frequency band; and
    data processing hardware in communication with the control circuitry and the primary radio circuitry; and
  memory hardware in communication with the data processing hardware, the memory hardware storing instructions that when executed by the data processing hardware cause the data processing hardware to perform operations comprising:
    receiving a data packet without known corresponding packet forwarding rules, the data packet comprising internet protocol (IP) address information, the IP address information including a source IP address and a destination IP address;
    executing a packet forwarding process for the data packet, the packet forwarding process configured to identify routing information for the received data packet based on the IP address information and determine corresponding packet forwarding rules based on the routing information;
    determining whether the destination IP address is associated with a wireless connection to the network routing device or a wired connection to the network routing device;
    when the destination IP address is associated with the wireless connection to the network routing device, offloading the packet forwarding rules onto the control circuitry of the primary Wi-Fi module, the packet forwarding rules when offloaded onto the control circuitry causing the control circuitry to:
  translate the destination IP address from a public destination IP address subnet to a private destination IP address subnet;
  attach the private destination IP address subnet to a header of the data packet; and
  forward the data packet from the control circuitry to a wireless interface, the wireless interface comprising radio circuitry offering a wireless communication link to the private destination IP address subnet; and
when the destination IP address is associated with the wired connection to the network routing device, offloading the packet forwarding rules onto the Ethernet switch, the packet forwarding rules when offloaded onto the Ethernet switch causing the Ethernet switch to:
  translate the destination IP address from the public destination IP address subnet to the private destination IP address subnet;
  attach the private destination IP address subnet to the header of the data packet; and
  forward the data packet to a wired local area network port of the network routing device, the wired local area network port offering a wired communication link to the private destination IP address subnet.

21. The network routing device of claim 20, further comprising at least one secondary Wi-Fi module connected to the control circuitry of the primary Wi-Fi module, the secondary Wi-Fi module including secondary radio circuitry coupled to a secondary antenna array, the secondary antenna array configured to transmit/receive radio frequency signals over a second frequency band different than the first frequency band.

22. The network routing device of claim 20, wherein the network routing device does not include a System-on-Chip subsystem.

23. The network routing device of claim 20, wherein the control circuitry translates the destination IP address from the public destination IP address subnet to the private destination IP address subnet by:
  stripping the public destination IP address subnet and payload from the data packet;
  storing, on the memory hardware, the public destination IP address subnet and the payload;
  retrieving the private destination IP address subnet from the memory hardware; and
  attaching the private destination IP address subnet to the header of the data packet.

24. The network routing device of claim 20, wherein the routing information indicates at least one of the following:
  ports/interfaces for directing the data packet into and out of the network routing device;
  whether the source IP address and the destination IP address include the same or different IP address subnets;
  whether to allow or reject the data packet based on firewall rules; and
  network address translation information for the IP address information.

25. The network routing device of claim 20, wherein the network routing device is configured to provide gigabit data transfer rates between a local network and an external network.

* * * * *